Patented July 25, 1950

2,516,106

UNITED STATES PATENT OFFICE 2,516,106

AMINOBENZENE COMPOUNDS CONTAINING FLUORINE

Joseph B. Dickey, Rochester, N. Y., assignor to Eastman Kodak Company, Rochester, N. Y., a corporation of New Jersey No Drawing. Application October 26, 1945, Serial No. 624,942

3 Claims. (Cl. 260—573)

This invention relates to monocyclic aminobenzene compounds containing a nuclear amino group which is substituted with an aliphatic hydrocarbon group having a trifluorinated carbon atom.

The compounds of my invention constitute valuable dye intermediates being useful in most instances as coupling components for the preparation of azo dyes. They are also useful for the production of intermediates for color photography. It is an object of my invention to provide new monocyclic aminobenzene compounds containing fluorine. Another object of my invention is to provide new aminobenzene compounds containing fluorine which are useful as dye intermediates and for the production of intermediates for color photography. A further object is to provide a satisfactory process for the preparation of the new aminobenzene compounds containing fluorine.

While my invention relates broadly to monocylic aminobenzene compounds containing a nuclear amino group which is substituted with an aliphatic hydrocarbon group having a trifluorinated carbon atom, it relates more particularly to monocyclic aminobenzene compounds containing a nuclear amino group which is substituted with a —$(CH_2)_nCF_3$ group, wherein $n$ is a whole positive integer from 1 to 5, inclusive. Ordinarily the nuclear amino group will be substituted with a 2,2,2-trifluoroethyl (—$CH_2CF_3$) group. In general, compounds having the general formula:

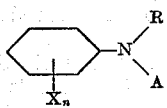

wherein R is hydrogen or an aliphatic group, A is an aliphatic hydrocarbon radical of from 2 to 6, inclusive, carbon atoms having a trifluorinated carbon atom, X is a low carbon alkyl group, a low carbon alkoxy group, a halogen atom or a low carbon aliphaticacylamino and $n$ is 0, 1 or 2 appear to be advantageous.

The nuclear amino group of the monocyclic aminobenzene compound can be substituted with either one or two aliphatic hydrocarbon groups having a carbon atom which is trifluorinated. Normally only one such aliphatic group will be present. Where two such aliphatic groups are present they can be the same group or different groups.

The aminobenzene compounds of the invention can be prepared by reacting a chlorobenzene compound with a trifluoroalkylamine. If desired a catalyst for the reaction such as powdered copper and cuprous oxide can be employed. The aminobenzene compounds of the invention can also be prepared by reaction between an aminobenzene and a trifluoroalkanol in the presence of a metallic hydrogenation catalyst, such as Raney nickel and other nickel catalysts, a cobalt catalyst and copper chromite. A still further method by which the compounds of the invention can be prepared is by reaction between an aminobenzene compound and a trifluoroalkyl halide in the presence of an acid binding agent. Acid binding agents that can be used include, for example, sodium carbonate, potassium carbonate, sodium hydroxide, potassium hydroxide, sodium bicarbonate, potassium bicarbonate and barium hydroxide. Each of these methods of preparation is illustrated hereinafter.

Trifluoroalkylamines that can be used in the preparation of the compounds of my invention include, for example 2,2,2-trifluoroethylamine

3,3,3-trifluoropropylamine

4,4,4-trifluorobutylamine

5,5,5-trifluoroamylamine

and 6,6,6-trifluorohexylamine

Trifluoroalkyl halides that can be employed include, for example, $CF_3CH_2Cl$, $CF_3CH_2Br$, $CF_3CH_2I$, $CF_3CH_2CH_2Cl$ and $CF_3CH_2CH_2CH_2Cl$. Trifluoroalkanol compounds that can be employed include, for example, 2,2,2-trifluoroethanol ($CF_3CH_2OH$) and $CF_3CHOHCH_3$.

In the interests of simplicity the term trifluoroethyl is frequently used throughout the specification instead of 2,2,2-trifluoroethyl. It will be understood that whenever the term trifluoroethyl is used herein 2,2,2-trifluoroethyl is intended.

The following examples illustrate the compounds of my invention and the processes used to prepare them.

*Example 1.—N-(2,2,2-trifluoroethyl)-aniline*

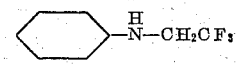

28 grams of chlorobenzene, 100 grams of 2,2,2-trifluoroethylamine (CF₃CH₂NH₂), 300 cc. of water, 0.25 gram of copper powder and 0.25 gram of cuprous oxide are heated together in a copper lined shaking autoclave at 220°–225° C. for 24 hours with shaking. When cool, the contents of the autoclave are removed and extracted with benzene. After drying the benzene extract is fractionally distilled under reduced pressure to recover N-(2,2,2-trifluoroethyl)-aniline and unreacted 2,2,2-trifluoroethylamine. N-(2,2,2-trifluoroethyl)-aniline is a colorless liquid boiling at 135–136°/12 mm.

Using the procedure described in Example 1 and employing the proper chlorobenzene compound, the following compounds are readily prepared:

N-trifluoroethyl-o-toluidine
N-trifluoroethyl-o-ethylaniline
N-trifluoroethyl-o-anisidine
N-trifluoroethyl-m-toluidine
N-trifluoroethyl-m-anisidine
N-trifluoroethyl-2-methoxy-5-methylaniline
N-trifluoroethyl-2-methoxy-5-acetaminoaniline
N-trifluoroethyl-3-acetaminoaniline By the use of 3,3,3-trifluoropropylamine (CF₃CH₂CH₂NH₂) 4,4,4-trifluorobutylamine (CF₃CH₂CH₂CH₂NH₂), 5,5,5-trifluoroamylamine (CF₃CH₂CH₂CH₂CH₂NH₂) and 6,6,6-trifluorohexylamine (CF₃CH₂CH₂CH₂CH₂CH₂NH₂), respectively, in place of 2,2,2-trifluoroethylamine in Example 1, N-(3,3,3-trifluoropropyl)-aniline, N-(4,4,4-trifluorobutyl)aniline, N-(5,5,5-trifluoroamyl)aniline and N-(6,6,6-trifluorohexyl)-aniline, respectively, are obtained. It will be understood that by the use of these amines, aniline compounds, in addition to aniline, containing a 3,3,3-trifluoropropyl group, a 4,4,4-trifluorobutyl group, a 5,5,5-trifluoroamyl or a 6,6,6-trifluorohexyl group on the nuclear amino group can be prepared. o-toluidine, o-ethylaniline, o-anisidine, m-toluidine, m-anisidine, 2-methoxy-5-methylaniline, 2-methoxy-5-acetaminoaniline, m-acetaminoaniline and m-propionylaminoaniline, for example, are illustrative of the aniline compounds that may be so substituted. Thus the following compounds can be prepared:

N-(3,3,3-trifluoropropyl)-o-toluidine
N-(3,3,3-trifluoropropyl)-2-methoxy-5-methylaniline
N-(3,3,3-trifluoroproply)-m-propionylaminoaniline
N-(4,4,4-trifluorobutyl)-m-toluidine
N-(4,4,4-trifluorobutyl)-2-methoxy-5-acetaminoaniline
N-(5,5,5-trifluoroamyl)-o-anisidine
N-(5,5,5-trifluoroamyl)-m-acetaminoaniline
N-(6,6,6-trifluorohexyl)-m-anisidine
N-(6,6,6-trifluorohexyl)-o-ethylaniline

*Example 2. — N-(2,2,2-trifluoroethyl)-4-nitroaniline*

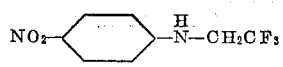

39.5 grams of para-nitrochlorobenzene, 100 grams of trifluoroethylamine, 300 cc. of butyl alcohol, 0.25 gram of copper powder, 0.25 gram of cuprous oxide and 26.5 grams of sodium carbonate are heated in a copper lined shaking autoclave at 220°–225° C. for 24 hours with shaking. When cool, the contents of the autoclave are removed and filtered. The filtrate is then fractionally distilled under reduced pressure (5 mm., for example) to recover butyl alcohol, unreacted trifluoroethylamine and the desired product, N-(2,2,2-trifluoroethyl)-4-nitroaniline.

Using the procedure of Example 2, the following compounds can be prepared:

N-(3,3,3-trifluoropropyl)-4-nitroaniline
N-(4,4,4-trifluorobutyl)-4-nitroaniline
N-(5,5,5-trifluoroamyl)-4-nitroaniline
N-(6,6,6-trifluorohexyl)-4-nitroaniline

*Example 3.—N-(2,2,2-trifluoroethyl)-p-phenylenediamine*

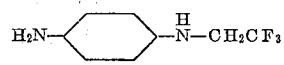

This compound is prepared by reducing N-(2,2,2-trifluoroethyl)-4-nitroaniline. The reduction can be carried out with tin and hydrochloric acid or more preferably with hydrogen under pressure in the presence of a catalyst such as Raney nickel.

Similarly, the following compounds can be prepared:

N-(3,3,3-trifluoropropyl)-p-phenylenediamine
N-(4,4,4-trifluorobutyl)-p-phenylenediamine
N-(5,5,5-trifluoroamyl)-p-phenylenediamine
N-(6,6,6-trifluorohexyl)-p-phenylenediamine

*Example 4.—N-(2,2,2-triflorethyl)-m-toluidine*

47 grams of m-toluidine, 80 grams of 2,2,2-trifluoroethanol and 5 grams of Raney nickel are heated together in a shaking autoclave for 25 hours. When cool, the contents of the autoclave are removed and filtered to remove nickel and the filtrate is fractionated under reduced pressure (6 mm., for example). N-(2,2,2-trifluoroethyl-m-toluidine is obtained in a good yield and boils at 145–147°/14 mm.

*Example 5. — N-(2,2,2-trifluoropropyl)-m-toluidine*

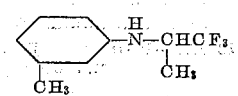

This compound is prepared by reacting 47 grams of m-toluidine with 90 grams of

CF₃CHOHCH₃ in accordance with the procedure described in Example 4.

Using the procedure described in Examples 4 and 5, the following compounds are readily prepared:

N-(2,2,2-trifluoropropyl)-o-chloroaniline
N-(2,2,2-trifluoropropyl)-m-n-butyrylaminoaniline
N-(2,2,2-trifluoropropyl)-aninline
N-(2,2,2-trifluoropropyl)-o-anisidine
N-(trifluoroethyl-2,5-dimethoxyaniline

*Example 6. — N-(2,2,2-trifluoroethyl)-o-anisidine*

17 grams of 2,2,2-trifluoroethylbromide, 12 grams of o-anisidine and 6 grams of sodium carbonate are placed in a suitable reaction vessel and heated under refluxing conditions until carbon dioxide ceases to be evolved. Upon cooling the reaction mixture is extracted with ethyl alcohol and the ethyl alcohol extract is fractionated under reduced pressure to give a good yield of N-(2,2,2-trifluoroethyl)-o-anisidine.

Example 7.—N,N-ditrifluoroethyl-m-toluidine

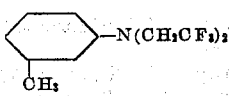

19 grams of N-trifluoroethyl-m-toluidine, 17 grams of trifluoroethylbromide and 6 grams of sodium carbonate are placed in a suitable reaction vessel and heated under refluxing conditions until carbon dioxide ceases to be evolved. The reaction product is extracted with ethyl alcohol and the ethyl alcohol extract is fractionated under reduced pressure (5 mm., for example) to give a good yield of N,N-ditrifluoroethyl-m-toluidine.

Example 8. — N-trifluoroethyl-N-difloroethyl-m-toluidine

This compound is obtained by reacting N-trifluoroethyl-m-toluidine with 2,2 - difluoroethylbromide ($CHF_2CH_2Br$) in accordance with the procedure described in Example 7.

Following the procedure of Examples 6, 7 and 8, the following compounds are readily prepared:

N,N-ditrifluoroethylaniline
N,N-ditrifluoroethyl-m-anisidine
N,N-di-(3,3,3-trifluoropropyl)-aniline
N,N-di-(4,4,4-trifluorobutyl)-m-chloroaniline
N,N-ditrifluoroethyl-m-bromoaniline
N,N-ditrifluoroethyl-m-fluoroaniline
N-trifluoroethyl-N-(3,3,3-trifluoropropyl)-aniline
N-trifluoroethyl-N-(4,4,4-trifluorobutyl)-m-toluidine
N-2,2-difluoro-n-propyl-N-trifluoroethylaniline
N-2,2-difluoro-n-propyl-N-trifluoroethyl-m-toluidine
N-2,2-difluoro-n-propyl-N-trifluoroethyl-m-anisidine
N-2,2-difluoro-n-propyl-N-trifluoroethyl-m-chloroaniline
N-2,2-difluoro-n-propyl-N-3,3,3-trifluoropropylaniline
N-2,2-difluoro-n-propyl-N-3,3,3-trifluoropropyl-m-toluidine
N-3,3-difluoropropyl-N-trifluoroethylaniline
N-3,3-difluoropropyl-N-trifluoroethyl-m-toluidine
N-3,3-difluoropropyl-N-trifluoroethyl-m-anisidine
N-3,3-difluoropropyl-N-trifluoroethyl-m-chloroaniline
N-3,3-difluoro-n-butyl-N-trifluoroethylaniline
N-3,3-difluoro-n-butyl-N-trifluoroethyl-m-toluidine
N-3,3-difluoro-n-butyl-N-trifluoroethyl-m-anisidine
N-3,3-difluoro-n-butyl-N-trifluoroethyl-m-bromoaniline
N-3,3-difluoro-n-butyl-N-3,3,3-trifluoropropylaniline
N-3,3-difluoro-n-butyl-N-3,3,3-trifluoropropyl-m-toluidine
N-3,3-difluoro-n-butyl-N-4,4,4-trifluorobutylaniline
N-3,3-difluoro-n-butyl-N-4,4,4-trifluorobutyl-m-toluidine
N-3,3-difluoro-n-butyl-N-trifluorobutyl-2-methoxy-5-methylaniline
N-β-methoxyethyl-N-trifluoroethylaniline
N-β-ethoxyethyl-N-trifluoroethylaniline
N-β-methoxyethyl-N-trifluoroethyl-m-toluidine
N-β-methoxyethyl-N-(4,4,4-trifluoro-n-butyl)-aniline Compounds containing the 2,2-difluoro-n-propyl ($—CH_2CF_2CH_3$), 3,3-difluoropropyl ($—CH_2CH_2CHF_2$)

and 3,3-difluoro-n-butyl groups ($—CH_2CH_2CF_2CH_3$)

are prepared by using an equivalent gram molecular weight of $CH_3CF_2CH_2Cl$, $ClCH_2CH_2CHF_2$ or $BrCH_2CH_2CHF_2$ and $CH_3CF_2CH_2CH_2Cl$, respectively, for the 2,2-difluoroethylbromide of Example 8.

Example 9.—N-β-hydroxyethyl-N-trifluoroethylaniline 17 grams of N-trifluoroethylaniline, 5 grams of ethylene oxide and 50 cc. of dioxane are heated together with stirring in an autoclave at 180° C. for six hours. Upon cooling, the reaction mixture is removed from the autoclave and distilled under reduced pressure. N-β-hydroxyethyl-N-trifluoroethylaniline boiling at 165–167°/18 mm. is obtained.

Using the procedure described in Example 9 and employing the proper alkylene oxide, (trimethylene oxide, propylene oxide, glycidol and β-methyl glycidol) the following compounds are readily prepared:

N-γ-hydroxypropyl-N-trifluoroethylaniline
N-β-hydroxypropyl-N-trifluoroethylaniline
N-β,γ-dihydroxypropyl-N-trifluoroethylaniline
N-4,5-dihydroxyamyl-N-trifluoroethylaniline
N-4,5-dihydroxyamyl-N-trifluoroethyl-m-toluidine
N-β-methyl-β,γ-dihydroxypropyl-N-trifluoroethylaniline
N-β-methyl-β,γ-dihydroxypropyl-N-trifluoroethyl-m-toluidine
N-β,γ-dihydroxypropyl-N-trifluoroethyl-m-butoxyaniline
N-β,γ-dihydroxypropyl-N-3,3,3-trifluoropropyl-m-toluidine
N-β,γ-dihydroxypropyl-N-4,4,4-trifluorobutyl-m-anisidine Where a β,γ-dihydroxypropyl group or other group which will decompose if the compound is attempted to be distilled is present, the reaction mixture is removed from the reaction vessel, filtered, if necessary, and the solvent medium removed by distillation under reduced pressure leaving the desired product as the residue of the distillation.

Example 10.—N-β-hydroxyethyl-N-trifluoroethyl-m-chloroaniline 20.9 grams of N-trifluoroethyl-m-chloroaniline, 5 grams of ethylene oxide and 50 cc. of dioxane are heated together with stirring in an autoclave at 180° C. for six hours. Upon cooling, the reaction mixture is removed from the autoclave and distilled under reduced pressure. A good yield of N-β-hydroxyethyl-N-trifluoroethyl-m-chloroaniline is obtained.

Example 11.—N-β,γ-dihydroxypropyl-N-trifluoroethyl-2-methoxy-5-acetaminoaniline 26.2 grams of N-trifluoroethyl-2-methoxy-5-acetaminoaniline and 10.6 grams of sodium carbonate are mixed together and heated with stirring in a suitable reaction vessel in an atmosphere of nitrogen to 140° C. Then 12 grams of glycerolchlorohydrin ($ClCH_2CHOHCH_2OH$) are added drop by drop with stirring over a period of three hours, while maintaining the temperature at 140° C. When carbon dioxide ceases to be evolved, the reaction mixture is extracted with acetic acid and the acetic acid extract is carefully fractionated under reduced pressure to remove the acetic acid. N-β,γ-dihydroxypropyl-N-trifluoroethyl-2-methoxy-5-acetaminoaniline is obtained as a dark, viscous product and is stored in a stoppered bottle.

Where the intermediate is to be used as a coupling component in the preparation of azo dyes the fractionation operation may be omitted and the acetic acid extract stored and used as such. If desired, the reaction mixture can be extracted with butyl alcohol and the desired product recovered by removing the butyl alcohol by distillation or evaporation.

*Example 12.—N-β,γ-dihydroxypropyl-N-trifluoroethyl-m-toluidine*

18.9 grams of N-trifluoroethyl-m-toluidine and 10.6 grams of sodium carbonate are mixed together and heated with stirring in a suitable reaction vessel in an atmosphere of nitrogen to 140° C. Then 12 grams of glycerolchlorohydrin are added drop by drop with stirring over a period of three hours, while maintaining the temperature at 140° C. When carbon dioxide ceases to be evolved, the reaction mixture is extracted with acetic acid and the acetic acid extract is carefully fractionated under reduced pressure (5 mm., for example) to remove the acetic acid. N-β,γ-dihydroxypropyl-N-trifluoroethyl-m-toluidine is obtained as a dark, viscous product and is stored in a stoppered bottle. If desired, the reaction product can be recovered by extraction with butyl alcohol as indicated above.

The process described in Examples 11 and 12 is broadly applicable. In place of the chlorohydrin used in the examples ethylene chlorohydrin, trimethylene chlorohydrin, β-methyl-β,γ-dihydroxypropylchlorohydrin, propylene chlorohydrin and 1-chloro-2,3,4-trihydroxybutane, for example, can be used to obtain compounds of the invention.

Using the procedures described in Examples 9, 10, 11 and 12, the following compounds are readily prepared:

N-β-hydroxyethyl-N-trifluoroethyl-m-toluidine
N-β-hydroxyethyl-N-trifluoroethyl-o-toluidine
N-β-hydroxyethyl-N-trifluoroethyl-o-anisidine
N-β-hydroxyethyl-N-trifluoroethyl-m-anisidine
N-β-hydroxyethyl - N - trifluoroethyl - m-fluoroaniline
N-β-hydroxyethyl - N - trifluoroethyl - m-bromoaniline
N-β-hydroxyethyl-N - trifluoroethyl-2-methoxy-5-methylaniline
N-β-hydroxyethyl-N - trifluoroethyl-2-methoxy-5-acetaminoaniline
N-β-hydroxyethyl - N - trifluoroethyl-m-aminoacetanilide
N-β-hydroxyethyl-N - trifluoroethyl-2,5-dimethoxyaniline
N-β-hydroxypropyl-N - trifluoroethyl-2,5-dimethoxyaniline
N-β-hydroxypropyl-N - trifluoroethyl-2-methoxy-5-methylaniline
N-β-hydroxypropyl-N-trifluoroethyl-m-toluidine
N-β-hydroxypropyl-N-trifluoroethyl-o-toluidine
N-β-hydroxypropyl-N-trifluoroethyl-m-anisidine
N-β-hydroxypropyl-N-trifluoroethyl-o-anisidine
N-β-hydroxypropyl-N - trifluoroethyl-2-ethoxy-5-acetaminoaniline
N-β-hydroxypropyl - N - trifluoroethyl-m-chloroaniline
N-β-hydroxypropyl-N - trifluoroethyl-m-fluoroaniline
N-β-hydroxypropyl-N-trifluoroethyl-2-methoxy-5-chloroaniline
N-γ-hydroxypropyl-N-trifluoroethyl-m-toluidine
N-β-hydroxyethyl-N-3,3,3-trifluoropropylaniline
N-β-hydroxyethyl-N-4,4,4-trifluorobutyl-m-toluidine
N-β,γ-dihydroxypropyl - N - 5,5,5 - trifluoroamylaniline
N-β-hydroxyethyl-N-5,5,5-trifluoroamyl-m-toluidine
N-β,γ-dihydroxypropyl-N-6,6,6-trifluorohexyl-m-toluidine

*Example 13.—N-β-cyanoethyl-N - trifluoroethylaniline*

20 grams of N-trifluoroethylaniline, 30 grams of acrylonitrile and 2 cc. of sulfuric acid are placed in a suitable reaction vessel and heated on a steam bath for several weeks. The sulfuric acid is then carefully neutralized by the addition of sodium hydroxide and the reaction mixture is fractionated under reduced pressure. A good yield of N-β-cyanoethyl-N - trifluoroethylaniline is obtained.

Using the procedure described in Example 13, the following compounds are readily prepared:

N-β-cyanoethyl-N-trifluoroethyl-m-toluidine
N-β-cyanoethyl-N-trifluoroethyl-m-chloroaniline
N-β-cyanoethyl-N - trifluoroethyl-2-methoxy-5-methylaniline
N-β-cyanoethyl-N-3,3,3-trifluoropropylaniline
N-β-cyanoethyl-N - 4,4,4 - trifluorobutyl-m-toluidine

*Example 14.—Ethyl ester of N-β-carboxyethyl-N-trifluoroethylaniline*

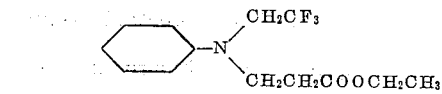

19.3 grams of the ethyl ester of N-β-carboxyethylaniline, 17 grams of trifluoroethylbromide and 6 grams of sodium carbonate are placed in a suitable reaction vessel and heated under refluxing conditions until carbon dioxide ceases to be evolved. Upon cooling, the reaction mixture is extracted with ethyl alcohol and the ethyl alcohol extract is fractionated under reduced pressure, 5 mm., for example, to give a good yield of the ethyl ester of N-β-carboxyethyl-N-trifluoroethylaniline.

Using the procedure described in Example 14, the following compounds are readily prepared:

Ethyl ester of N-β-carboxyethyl-N-trifluoroethyl-m-toluidine
Ethyl ester of N-β-carboxyethyl-N-trifluoroethyl-m-chloroaniline
Ethyl ester of N-β-carboxyethyl-N-trifluoroethyl-m-fluoroaniline
Ethyl ester of N-β-carboxyethyl-N-trifluoroethyl-o-toluidine
Ethyl ester of N-β-carboxyethyl-N-3,3,3 - trifluoropropylaniline
Ethyl ester of N-β-carboxyethyl-N-3,3,3 - trifluoropropyl-m-toluidine
Ethyl ester of N-β-carboxyethyl-N-3,3,3 - trifluoropropyl-m-anisidine
Ethyl ester of N-β-carboxyethyl-N-3,3,3 - trifluoropropyl-m-chloroaniline
Ethyl ester of N-β-carboxyethyl-N-4,4,4 - trifluorobutylaniline By the use of an equivalent gram molecular weight of the methyl ester of N-β-carboxyethylaniline for the ethyl ester of N-β-carboxyethylaniline of the example, the corresponding methyl ester compounds can be prepared.

*Example 15.—N-γ-ketobutyl - N - trifluoroethylaniline*

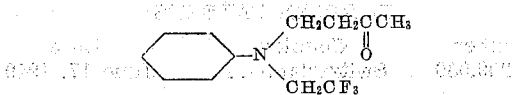

16 grams of N-γ-ketobutylaniline, 17 grams of trifluoroethylbromide and 6 grams of sodium carbonate are placed in a suitable reaction vessel and heated under refluxing conditions until carbon dioxide ceases to be evolved. Upon cooling, the reaction mixture is extracted with ethyl alcohol and the ethyl alcohol extract is fractionated under reduced pressure (3 mm., for example) to give a good yield of N-γ-ketobutyl-N-trifluoroethylaniline.

Using the procedure described in Example 15, the following compounds are readily prepared:

N-γ-ketobutyl-N-trifluoroethyl-m-toluidine
N-γ-ketobutyl-N-trifluoroethyl-o-toluidine
N-γ-ketobutyl-N-trifluoroethyl-m-anisidine
N-γ-ketobutyl-N - trifluoroethyl-m-chloroaniline
N-γ-ketobutyl-N - trifluoroethyl-m-bromoaniline
N-γ-ketobutyl-N - trifluoroethyl-m-fluoroaniline
N-γ-ketobutyl - N - trifluoroethyl - 2-methoxy-5-methylaniline
N-γ-ketobutyl - N - trifluoroethyl - 2-methoxy-5-acetaminoaniline
N-β-ketopropyl-N-trifluoroethylaniline
N-β-ketobutyl-N-trifluoroethylaniline
N-γ-ketoamyl-N-trifluoroethylaniline
N-γ-ketobutyl-N-3,3,3-trifluoropropylaniline
N-γ-ketobutyl-N - 2,2,2 - trifluoropropyl-m-toluidine
N-γ-ketobutyl-N-4,4,4-trifluorobutyl-m-toluidine It will be understood that the foregoing examples are intended to be illustrative and not limitative of my invention. To illustrate the compounds of Example 2 can be treated in accordance with the procedure described herein to introduce a second group into the amino group. Thus, the following compounds can be readily prepared:

N - β - hydroxyethyl-N-trifluoroethyl-4-nitroaniline
N - β - hydroxypropyl - N-trifluoroethyl-4-nitroaniline
N - γ - hydroxypropyl - N-trifluoroethyl-4-nitroaniline
N - β,γ - dihydroxypropyl - N-trifluoroethyl-4-nitroaniline
N - 4,5 - dihydroxyamyl-N-trifluoroethyl-4-nitroaniline
N,N-ditrifluoroethyl-4-nitroaniline
N - 2,2 - difluoroethyl - N-trifluoroethyl-4-nitroaniline
N - 3,3 - difluoro-n-propyl-N-trifluoroethyl-4-nitroaniline
N - β - methoxyethyl-N-trifluoroethyl-4-nitroaniline
N - β - ethoxyethyl-N-trifluoroethyl-4-nitroaniline
N - β - carboxyethyl-N-trifluoroethyl-4-nitroaniline
Methyl ester of N-β-carboxyethyl-N-trifluoroethyl-4-nitroaniline
Ethyl ester of N-β-carboxyethyl-N-trifluoroethyl-4-nitroaniline The trifluoroethyl group present in each of the compounds above named can be replaced by the other trifluoroalkyl groups disclosed herein and these compounds as well as the compounds resulting from the reduction of the nitro group, of the compounds under discussion, to an amino group, as illustrated in Example 3, for example, are included within the scope of my invention.

As previously indicated the compounds of the invention are useful in the preparation of azo dye compounds. Thus compounds capable of coupling can be coupled with diazotized aromatic compounds to form azo dyes. Aromatic amines that can be employed include, for example, p-nitroaniline, o-chloro-p-nitroaniline, o-bromo-p-nitroaniline, o-cyano-p-nitroaniline, o-chloroaniline, p-aminoacetophenone and 2,4-dinitro-6-chloroaniline. These amines when diazotized and coupled with the coupling compounds of the invention yield dyes which can be used for the coloration of cellulose organic esters, especially cellulose acetate, and nylon. Thus the dye formed by coupling diazotized p-nitroaniline with N-trifluoroethylaniline colors cellulose acetate and nylon textile materials red shades while that from diazotized o-chloro-p-nitroaniline and N-β-hydroxyethyl-N-trifluoroethyl-m-toluidine colors cellulose acetate and nylon textile materials rubine shades. The dye formed from diazotized p-aminoacetophenone and N-trifluoroethyl-m-toluidine colors cellulose acetate and nylon textile materials orange shades.

Compounds of my invention containing a diazotizable free amino group can be diazotized and coupled with p-cresol, N-(di-β-hydroxyethyl)-aniline, N-β,γ-dihydroxypropyl-m-toluidine and N-β-hydroxyethyl-m-chloroaniline, for example, to obtain dye compounds which color cellulose acetate and nylon textile materials. To illustrate, the dye compound formed by coupling diazotized N-trifluoroethyl-p-phenylenediamine with p-cresol or that formed by coupling diazotized N-β-hydroxyethyl-N-trifluoroethyl-p-phenylenediamine with N-(di-β-hydroxyethyl)-aniline color cellulose acetate and nylon textile materials yellow shades. Similarly, the dye compounds formed by coupling these last two named diazotized compounds with dimethyldihydroresorcinol (5,5-dimethyl-cyclohexandione-1,3) color cellulose acetate and nylon textile materials red shades.

Monocyclic aminobenzene compounds containing a nuclear amino group which is substituted with an aliphatic hydrocarbon group having a difluorinated carbon atom are described and claimed in my copending application, Ser. No. 624,943, filed October 26, 1945.

I claim:

1. A compound selected from the group of compounds consisting of N-β-hydroxyethyl-N-2,2,2-trifluoroethylaniline and N-β,γ-dihydroxypropyl-N-2,2,2-trifluoroethyl-m-toluidine.

2. The compound having the formula:

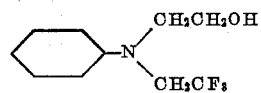

3. The compound having the formula:

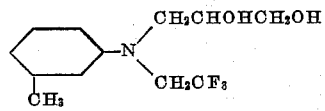

JOSEPH B. DICKEY.

(References on following page)

REFERENCES CITED

The following references are of record in the file of this patent:

UNITED STATES PATENTS

| Number | Name | Date |
|---|---|---|
| 2,082,156 | Felix et al. | June 1, 1937 |
| 2,118,661 | Baumann | May 24, 1938 |
| 2,136,171 | Maier | Nov. 8, 1938 |
| 2,153,018 | Heyna et al. | Apr. 4, 1939 |
| 2,173,417 | Huber | Sept. 19, 1939 |
| 2,194,927 | Daudt et al. | Mar. 26, 1940 |
| 2,240,965 | Van Melsen | May 6, 1941 |

FOREIGN PATENTS

| Number | Country | Date |
|---|---|---|
| 209,089 | Switzerland | June 17, 1940 |